(12) United States Patent  (10) Patent No.: US 10,155,325 B2
Kalita et al.  (45) Date of Patent: Dec. 18, 2018

(54) FUNCTIONALIZED AND MULTIFUNCTIONAL COMPOSITE MATERIAL, METHOD AND APPLICATIONS

(71) Applicants: Parash Kalita, Springdale, AR (US); Wenping Jiang, Springdale, AR (US)

(72) Inventors: Parash Kalita, Springdale, AR (US); Wenping Jiang, Springdale, AR (US)

(73) Assignee: NanoMech, Inc., Springdale, AR (US)

( * ) Notice: Subject to any disclaimer, the term of this patent is extended or adjusted under 35 U.S.C. 154(b) by 515 days.

(21) Appl. No.: 14/138,734

(22) Filed: Dec. 23, 2013

(65) Prior Publication Data

US 2014/0178629 A1   Jun. 26, 2014

Related U.S. Application Data

(60) Provisional application No. 61/745,278, filed on Dec. 21, 2012.

(51) Int. Cl.
*B27K 3/22* (2006.01)
*B27K 3/16* (2006.01)
(Continued)

(52) U.S. Cl.
CPC ............... *B27K 3/22* (2013.01); *B27K 3/16* (2013.01); *B29C 47/0004* (2013.01); *B29C 47/0019* (2013.01); *B29C 47/025* (2013.01); *B29C 47/04* (2013.01); *B29C 47/043* (2013.01); *B29C 47/065* (2013.01); *C01B 39/00* (2013.01); *C08L 97/02* (2013.01); *Y10T 428/24066* (2015.01)

(58) Field of Classification Search
CPC . B27K 3/16; B27K 3/22; B27K 3/005; B27K 3/007; Y10T 428/662; Y10T 428/31989; Y10T 428/249959; Y10T 428/24997; Y10T 428/4935; Y10T 428/25; Y10T 428/253; Y10T 428/2904; Y10T 428/2907; Y10T 428/2927; Y10T 428/2938; Y10T 428/2933; Y10T 428/2913; Y10T 428/294; Y10T 428/2949; Y10T 428/2958; B29B 15/10; B29B 15/105; B29C 47/0014; B29C 47/0019; B29C 47/0004; C01B 39/00; C01B 39/02; C01B 39/16; C01B 39/026
USPC ........ 428/540, 326, 361, 372; 264/109, 123, 264/125, 126
See application file for complete search history.

(56) References Cited

U.S. PATENT DOCUMENTS 6,541,038 B1 *  4/2003  Tanaka ................. B27K 3/0292
                                               424/195.18
2005/0126430 A1 *  6/2005  Lightner, Jr. .......... B27K 3/005
                                                 106/15.05
(Continued)

FOREIGN PATENT DOCUMENTS

EP         0136275 A1 *  4/1985 ............. A01N 59/02

*Primary Examiner* — Catherine A. Simone

(57) ABSTRACT

Open-architecture constituents, such as wood fibers, are coated with an intercalated functional material and bound together to form a solid product, such as a plank. Applications for this material include decking, fencing, and the like. The functional material is applied prior to forming the solid product, either as a coating on each fiber or inserted in a fiber or fiber cluster. As the constituents, such as fibers, wear during use of the product, the functional material is released to provide continual protection of the product, such as UV resistance and fungal resistance.

7 Claims, 2 Drawing Sheets

(51) Int. Cl.
  *C01B 39/00* (2006.01)
  *B29C 47/00* (2006.01)
  *B29C 47/02* (2006.01)
  *B29C 47/04* (2006.01)
  *B29C 47/06* (2006.01)
  *C08L 97/02* (2006.01)

(56) References Cited

U.S. PATENT DOCUMENTS

| | | | |
|---|---|---|---|
| 2005/0265893 A1* | 12/2005 | Leach | A01N 25/12 422/40 |
| 2008/0160288 A1* | 7/2008 | Kingma | B27K 3/007 428/326 |
| 2010/0003488 A1* | 1/2010 | Danzer | B32B 21/14 428/220 |
| 2013/0048190 A1* | 2/2013 | Gupta | B27N 3/04 156/62.2 |

\* cited by examiner

FUNCTIONALIZED AND MULTIFUNCTIONAL COMPOSITE MATERIAL, METHOD AND APPLICATIONS

CROSS-REFERENCE TO RELATED APPLICATIONS

This application claims the benefit of U.S. provisional patent application No. 61/745,278, entitled "Functionalized and Multifunctional Composite Material, Method and Applications," filed on Dec. 21, 2012. Such application is incorporated herein by reference in its entirety.

STATEMENT REGARDING FEDERALLY SPONSORED RESEARCH OR DEVELOPMENT

Not applicable.

BACKGROUND OF THE INVENTION

Wood is a widely used today as a building material for numerous outdoor applications, including decks, fencing, walkways, gazebos, and boardwalks. Wood is preferred to many other materials in these applications due to its appearance and relatively low cost. Wood is, however, a naturally porous organic material, and is highly susceptible to the growth of fungi and bacteria upon and within its exposed surfaces. Fungal and bacterial growth serves to discolor the wood and reduce its effective lifetime for these applications, since the growth of these microorganisms will eventually cause the wood to rot away. In addition, wood is susceptible to damage by insects such as termites. Given its porous structure, wood tends to absorb moisture, which furthers its breakdown over time. Finally, exposure to ultraviolet (UV) light over time causes the wood to fade and eventually break down. For all these reasons, untreated wood is generally not used in outdoor applications.

The art includes a number of methods of preserving wood that are intended to improve its lifetime when exposed outdoors, thus making it a more practical choice for various outdoor applications. One preservation solution is to simply paint the wood, such that its outer surface is no longer directly exposed. Paint, however, must be periodically re-applied, since even the most advanced paints will eventually wear, peel, blister, or otherwise lose their effectiveness. The periodic repainting required greatly increases the cost of wood as a building material for these applications. In addition, many people desire the appearance of unpainted, natural wood for applications such as decking and fencing, and thus painting the wood is not a feasible option for such applications.

Another method of preserving wood is by chemically treating the wood by various known means. The treatment of wood with tar has been known since ancient times. Railroad ties and utility poles are commonly pressure-treated using creosote as a preservative. A common process still used today to treat lumber involves the application of chromated copper arsenate (CCA). The CCA application process uses a vacuum and pressure cycle during which an aqueous solution of CCA is applied to the wood, after which the treated wood is stacked and left to dry. The application of pressure and vacuum cycles during the process causes a deeper and more uniform penetration of the wood by the applied preservative. The various components of CCA render different desirable properties to the treated wood; copper acts as a fungicide, arsenic acts as an insecticide, and chromium provides some measure of ultraviolet (UV) light resistance. CCA has fallen into disfavor, however, due to the concern that CCA may leech from wood over time, thereby causing environmental harm. As a result, alkaline copper quaternary (ACQ) has become more widely used as a preservative; this material is made up of copper, a quaternary ammonium compound, and an insecticide. Various other copper materials have also been used or proposed for use in connection with wood preservation.

More recently, particulate copper has begun to be used in wood preservation. In this case, copper is ground to micro-sized particles and suspended in water before being applied to the wood, rather than being dissolved in a chemical reaction such as with the CCA and ACQ processes. In order to be effective, the copper particles must be small enough to penetrate the porous wood structure. Reported sizes of such copper particles are on average less than 300 nm. Certain copper-treated wood products are advertised as utilizing micro-sized copper particle technology, such as MicroPro wood products marketed by Osmose, Inc., and Wolmanized wood products marketed by Arch Wood Protection, Inc. These products are simply wood lumber treated with the copper particles, and thus they are relatively expensive, and the degree to which the copper particles impregnate the wood is limited to only the very outer surface of the wood, while much of the wood remains untreated.

Due to the inherent difficulties of preserving wood and the cost of natural lumber, an environmentally sustainable solution to producing a more durable product with the appearance of wood is to form the product from wood-composite materials, which are in a class of materials known as engineered wood. For example, decking or fencing boards may be pressed from a blend of wood fiber and recycled plastic fibers. Such products are currently marketed by Trex Company as Transcend decking, and Advanced Environmental Recycling Technologies, Inc. as ChoiceDek composite decking. These materials may provide a cost advantage over wood lumber, since they can be formed of waste wood fiber and recycled plastics. In a typical process, the various component materials such as polymer, wood particles, coloring agents, antifungal agents such as boron or copper and iron based compounds, are simply mixed and blended in a vat, heated to a melting temperature, and then extruded into lumber-shaped pieces.

While composite decking materials may offer advantages over chemically treated wood lumber with respect to cost, they have not proven to be immune to mold and associated discoloration. Consumers have also reported the problem of "chalking," whereby the material wears away in a powdery form on its surface, such that a person touching the material (as on a handrail or guard) may find his or her hand coated with a fine powder as a result. Wear may cause the product to quickly lighten in high-wear areas, resulting in an unsightly appearance. Other reported problems in these wood-polymer blends are UV discoloration, fungal growth, moisture trapping, and others. To stop such degradation, companies like Trex have begun producing a laminate wood-polymer composite with a polymer jacket. That polymer jacket, however, gets excessively hot, and is thus undesirable for many applications.

Because of the drawbacks in all of the available outdoor wood applications products on the market today, a new product that has the aesthetic appearance of wood but which is long-lasting and does not require continued cleaning and maintenance is highly desirable.

References mentioned in this background section are not admitted to be prior art with respect to the present invention.

BRIEF SUMMARY OF THE INVENTION

The present invention is directed to a composite material for applications including but not limited to decking, fencing, and the like, where the composite material is formed by functionalizing individual wood fibers or other such open-architecture constituents selectively in the composite material. The functional material is applied either as a coating on inserted in a fiber or fiber cluster. The functional material is thus intercalated within the composite. The fact that wood wears (yields to mechanical shearing) relatively easily has long been seen as a disadvantage in the use of wood or other such open-architecture constituents in these types of applications, and in particular in wood composite decking. But the inventors hereof has recognized that the lack of durability of wood fibers is actually advantageous when individual wood fibers are coated with a functional material and act as a "delivery system" for functions such as UV resistant, fungal resistant chemistries. This is because as the wood fibers are worn down—such as by walking on decking planks—the wood fibers will wear and release the functional material by which they are coated and intercalated, thereby providing a constantly replenishing protective agent to the surface of the wood composite material. The wood thus acts as a delivery medium for the functional material. The invention turns what has been perceived as a drawback of wood into an advantage, such that in the present invention, wood's poor natural durability actually provides greater protection for the product than would be provided by a mere surface chemical coating of a composite part, or a simple mixture and blending of functional materials into a wood-plastic matrix. Instead, in effect, the wood composite exhibits a self-healing property due to the release of functional material, on-site and on-demand, thereby resulting in a product with dramatically longer life and surprising, unexpected advantages over previously known products. The present invention takes advantage of the open architecture of natural wood—it is largely an open structure, like tubes, formed by cell walls made up of cellulose and lignin as a binder—such that the functional material coats these cellulose tube walls and also, in certain embodiments, could insert in the hollow tubes, and is thus available to protect the wood itself while also releasing to seal up any breaks when the cell wall structure is damaged. Similar composite materials can be also made within the scope of the invention using other open-architecture constituents, such as but not limited to zeolites.

While the invention is broadly directed to the employment of any functional material for any desirable application in the protection of wood or other open-architecture constituents within a composite material wherein the constituents are coated with the material, applications may include fungicidal and microbe resistant agents, insect resistance, fade resistance, coloring agents, UV protecting agents, and others. In certain preferred embodiments, the coating material is a nanoscale metal or metal alloy, such as elemental copper or selenium.

It may be seen that a coated and intercalated wood fiber composite material has a number of important advantages over existing products today. The individual coated wood fiber or individual bundle of fibers is itself sealed within the coating material or is injected with functional material, so that the material is highly resistant to rot or degradation due to, for example, fungi, bacteria, mechanical forces or UV rays. The material is also highly resistant to damage as a result of wear; if the material is walked over, for example, any pieces or ends of wood fiber that are broken away or damaged will be protected by the functional coating material that is released by this damage. Thus the raw wood fiber remains protected within the material despite the damage, such that the appearance to the naked eye and function of the material remains relatively stable despite this wear. Intercalated functional material also could provide heat carrying capacity at each fiber level keeping the surface of the part cooler.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

The process for producing a material according to a preferred embodiment may first be described. The process begins with the presentation of an open-architecture constituent, in this preferred embodiment being wood fibers, such as may be extracted from wood chips or other sources by means that are known in the art. These extracted wood fibers are then treated with a liquid that comprises small particles of functional material. Since wood cell structure typically has openings on the scale of 10-100 $\mu$m, the particles of functional material are preferably small enough to easily fit within such a structure, and in a preferred embodiment are sub-micron scale particles, that is, particles that are of a size equal to or less than about 1000 nm. The media within which the particles of functional material are suspended may be of any sort that is capable of impregnating wood fiber, but in a preferred embodiment the liquid media is a vegetable oil such as soybean oil. The wood fibers may be introduced to the soybean oil carrying the functional material particles, and thereby the wood cell structure of each wood fiber is evenly coated in the functional particles, both on the exterior of the wood cells and within the wood cell structure openings. To improve the effectiveness of the coating material or to reduce the time of exposure required to achieve a desirable coating, pressure and/or vacuum may be applied to the wood fiber during impregnation with the soybean oil media.

Various functional materials may be used in different embodiments of the invention, depending upon the desired application and properties, including combinations of functional materials. As already noted, copper sub-micron sized particles may be used in order to provide an antifungal property to the product. Titanium dioxide may be added to provide UV resistance. Various pigments may be added to provide a desired color to the material. It may be seen that in the example where pigments are added, the resulting product is protected from fading due to wear, since as the product wears additional pigment particles are exposed along with wood fibers, thereby resulting in a product whose color is relatively unchanged by wear.

Figure 1:
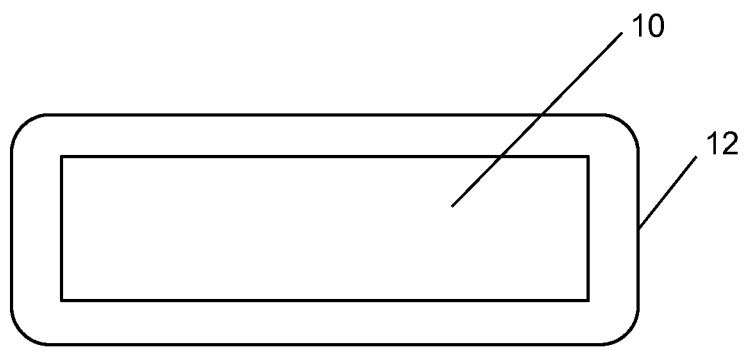
FIG. 1 is a cut-away elevational view of a co-extruded product according to a preferred embodiment of the present invention.

The mixture of wood fibers intercalated with the functional material or materials may then be, in a preferred embodiment, heated, and a finished product such as a decking board formed by extrusion. Extrusion production methods are well known in the art. In this embodiment of the invention, it may be seen that the wood fiber is protected regardless of the degree of wear that the material receives, since the functional material is distributed onto wood cells throughout the material. If a lower cost product is desired, however, co-extrusion may be employed whereby only an outer layer of the material contains the wood fiber intercalated with functional material. Such a structure is shown in FIG. 1, which depicts the cross-section of a co-extruded board as may be used for a typical decking application. A material 10, which does not contain the functional particles, is co-extruded with an outer layer 12, which does contain the functional particles and combinatorial chemistries intercalated on and in wood fibers. Provided that outer layer 12 is sufficiently thick that normal wear to which the product is exposed does not reach entirely through outer layer 12, then the resulting product may provide similar protection to a material composed entirely of wood fibers with intercalated functional material, but may do so at a much lower cost of production due to savings in the volume of functional chemistries required. As an alternative embodiment, co-extruding may be replaced with a painted coating, a spray coating, dip coating, or other known means to apply an outer layer 12 to a material 10.

While one preferred embodiment is a wood composite material as described herein, the invention is also applicable to composite materials formed with other open-architecture particles that may thus receive functionalized coating materials. For example, one commercially important class of such materials is zeolites, which are microporous, aluminosilicate materials commonly used in a number of industries as adsorbents.

Figure 2:
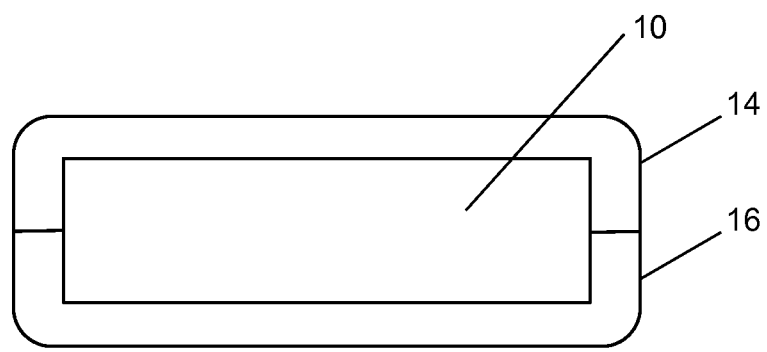
FIG. 2 is a cut-away elevational view of a co-extruded, two-sided product according to a preferred embodiment of the present invention.

The preferred embodiments further include a number of applications of the processes and materials described herein. In the simplest application, the product composed of wood fibers intercalated with functional material is simply extruded into various shapes, such as boards, from which decking and other structures may be constructed. A lower cost may be realized by employing co-extruded boards as illustrated in FIG. 1. In another embodiment, illustrated in FIG. 2, the co-extruded board may have a top coating 14 and a bottom coating 16 that comprise different functional properties offering anisotropic multifunctionality to the end user. For example, UV resistance may not be required on bottom coating 16 since this face of the material will be to the ground, and thus cost savings may be achieved in this way. This approach may also allow for different aesthetic qualities for the product, such as using different coloring pigments in top coating 14 and bottom coating 16; in a multi-layer deck, for example, this would allow the bottom of an upper-level deck to appear as a different color than the top of a lower-level deck. In another alternative embodiment, a deck could be desired where boards such as illustrated in FIG. 2 may be rotated, so that even in a single-layer deck the owner could switch between two different deck colors as desired.

Figure 3:
FIG. 3 is a cut-away elevational view of a co-extruded product with a conducting mesh according to a preferred embodiment of the present invention.
Figure 4:
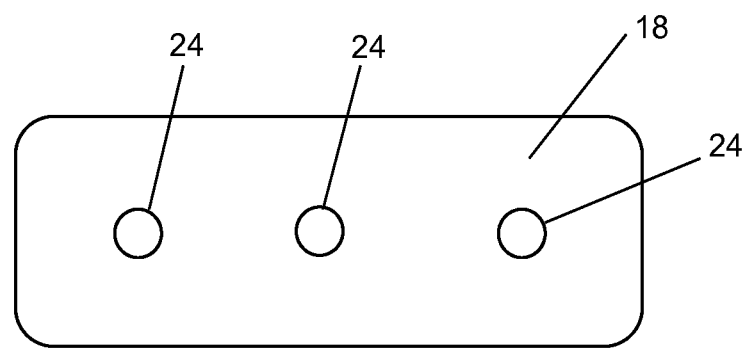
FIG. 4 is a cut-away elevational view of a product incorporating thermally conducting pipes according to a preferred embodiment of the present invention.

The unique structure of the present invention also allows for a number of applications that involve sensors or other electrical devices embedded, such as co-extruded, printed, stamped, packaged, on and within the material itself. For example, as illustrated in FIG. 3, sensors could be embedded within a co-extruded electrically conductive mesh material 20 that is presented on a board 18, which preferably is either a solid material comprised of wood fibers intercalated with a functional material, or a material that is co-extruded with an outer layer 12 of such material as shown in FIG. 1. Electrodes 22 may connect individual boards or pieces forming the structure. Electrodes 22 connect with the conductive mesh disposed in conductive mesh material 20, providing a pathway from a power source (not shown) to the sensors embedded in mesh material 20 of the material. In this way, various structures could be built that act upon the sensing of weight on a board 18. For example, the sensors of mesh material 20 might activate a footlight, such that as a person begins to walk across a deck, footlights are activated that illuminate the area of each step, which may be particularly desirable where the users are children or senior citizens. The lights may also serve a security function, alerting a homeowner to the presence of an intruder walking over the sensors. In a related embodiment, lighting emitting devices, such as light emitting diodes (LEDs) could be embedded in conductive mesh material 20 itself, and thereby provide an interspersed or uniform lighting across the surface of the board upon which a user is waking. The effect could be as a safety measure, such as for providing light while walking in darkness, or could be used as an aesthetically pleasing display, such as lighting up an entire deck when a person walks upon the deck to display a pleasing light pattern. Alternatively, the sensors may be embedded and light-emitting devices could be embedded within the conductive mesh material 20 but operated by an external control, such as a light switch.

Another application of the preferred embodiment of FIG. 3 would be the incorporation of energy harvesting structures, such as solar cells within a board 18 using a conductive mesh 20. The solar cells would allow for the collection of sunlight when the deck or other surface is not in use, but then the boards 18 could be mechanically flipped as by a gear mechanism such that the side of boards 18 without the solar cells could be exposed when the user desires to walk across the deck. The core of the extruded structure could include energy storage tanks, such as batteries and interconnects, to store power from energy harvesting devices.

Still another application within the scope of the present invention would be the arrangement of an interconnected series of thermally conducting pipes 24 within board 18. These pipes could be used to carry fluids, such as water that is heated in boards 18 as those boards are exposed to sun during the daytime, and then through a heat exchange system, as is well known in the art, that heat could be used to provide electrical power, heating, or cooling.

Certain ranges have been provided in the description of these particular embodiments with respect to certain parameters. When a range of values is provided, it should be understood that each intervening value between the upper and lower limit of that range and any other stated or intervening value in that stated range is encompassed within the invention, subject to any specifically excluded limit in the stated range. Where the stated range of values includes one or both of the limits, ranges excluding either or both of those limits are also included in the scope of the invention.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. As used herein, "consisting of" excludes any element, step, or ingredients not specified in the claim element. As used herein, "consisting essentially of" does not exclude materials or steps that do not materially affect the underlying novel characteristics of the claim. When a Markush group or other grouping is used herein, all individual members of the group and all combinations and subcombinations possible of the group are intended to be individually included in the disclosure. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

The invention claimed is:

1. A composite material, comprising
   a. a plurality of open-architecture constituents extracted from an original source material, wherein the plurality of open-architecture constituents comprise an internal surface and an external surface and wherein the open-architecture constituents comprise at least one zeolite; and
   b. a functional material comprising a plurality of particles no larger than 1,000 nm in diameter
   wherein the functional material coats the internal surface of the plurality of open-architecture constituents and the external surface of the open-architecture constituents to produce a plurality of constituents intercalated with functional material, further wherein the plurality of intercalated constituents are combined to form a solid product.

2. The composite material of claim 1, wherein the functional material is selected from the group consisting of metals and metal alloys.

3. The composite material of claim 2, wherein the functional material comprises copper.

4. The composite material of claim 1, wherein the functional material comprises titanium dioxide.

5. The composite material of claim 1, wherein the functional material comprises a pigment.

6. The composite material of claim 1, wherein the functional material comprises selenium.

7. A construction product, comprising a solid composite material comprising at least one zeolite intercalated with at least one functional material comprising a plurality of particles no larger than 1,000 nm in diameter, wherein the functional material coats an inner surface of the at least one zeolite, further wherein the at least one zeolite are sealed within the functional material and combined to form the solid composite material.

* * * * *